(12) United States Patent
Yang et al.

(10) Patent No.: US 8,339,391 B2
(45) Date of Patent: Dec. 25, 2012

(54) METHOD AND SYSTEM FOR DIRECT RENDERING OF MULTI-VOLUME DATA

(75) Inventors: Lining Yang, East Windsor, NJ (US); Christian Isleib, Koblenz (DE)

(73) Assignee: Siemens Medical Solutions USA, Inc., Malvern, PA (US)

(*) Notice: Subject to any disclaimer, the term of this patent is extended or adjusted under 35 U.S.C. 154(b) by 1303 days.

(21) Appl. No.: 12/060,441

(22) Filed: Apr. 1, 2008

(65) Prior Publication Data

US 2009/0027382 A1    Jan. 29, 2009

Related U.S. Application Data

(60) Provisional application No. 60/952,388, filed on Jul. 27, 2007.

(51) Int. Cl.
*G06T 15/00* (2011.01)
(52) U.S. Cl. ......... 345/419; 345/423; 345/424; 345/581
(58) Field of Classification Search .................. None
See application file for complete search history.

(56) References Cited

U.S. PATENT DOCUMENTS

| | | | |
|---|---|---|---|
| 5,544,283 A | 8/1996 | Kaufman et al. | |
| 5,553,618 A | 9/1996 | Suzuki et al. | |
| 6,353,677 B1 | 3/2002 | Pfister et al. | |
| 7,339,587 B2 | 3/2008 | Kropfeld | |
| 2003/0007593 A1 | 1/2003 | Heuscher et al. | |
| 2003/0233039 A1 | 12/2003 | Shao et al. | |
| 2003/0234781 A1 | 12/2003 | Laidlaw et al. | |
| 2008/0024493 A1* | 1/2008 | Bordoloi et al. | 345/423 |

OTHER PUBLICATIONS

Grimes, et al., "Flexible Direct Multi-Volume Rendering in Dynamic Scenes", Proceedings of the 9th Internatinal Fall Workshop on Vision, Modeling and Visualization, Stanford, USA, Nov. 16-18, 2004, pp. 379-386.
Grimm, et al., "V-Objects: Flexible Direct Multi-Volume Rendering in Interactive Scenes", Tech. Rep. TR-186-2-04-06, Institute of Computer Graphics and Algorithms, Vienna University of Technology, Apr. 2004.
Grimm, et al., "Memory Efficient Acceleration Structures and Techniques for CPU-based Volume Raycasting of Large Data", Proceedings of the 2004 IEEE Symposium on Volume Visualization and Graphics, Oct. 11-12, 2004, Austin Texas, ISA, pp. 1-8.

(Continued)

*Primary Examiner* — Kee M Tung
*Assistant Examiner* — Jwalant Amin
(74) *Attorney, Agent, or Firm* — Peter Kendall (57) ABSTRACT

A method for performing direct rendering of a multi-volume data, having the steps of determining whether a volume of the multi-volume data is one of active and inactive via interaction with a ray for the multi-volume data, recording in triplicate a starting point and an end point of the ray for an eyespace, repeating the determining whether the volume is one of active and inactive via interaction with a ray for the multi-volume data and the recording in triplicate a starting point and an end point of the ray for an eyespace for all volumes of the multi-volume data, providing triples from all volumes to an array, sorting the array to create a sorted triples list array, breaking the ray into a plurality of segments using the sorted triples list array, determining which volumes are active for each of the segments via an active volume list, and sampling each segment of the ray to acquire an accumulated result.

20 Claims, 5 Drawing Sheets

OTHER PUBLICATIONS

Adrian Leu & Min Chen: Modelling and Rendering Graphics Scenes Composed of Multiple Volumetric Datasets, University of Wales Swansea, UK, 1997, pp. 1-20 & Bib.

F. Robler, et al.: "GPU-based Multi-Volume Rendering for the Visualization of Functional Brain Images", Proc. of SimVis 2006, pp. 305-318 & Bib.

* cited by examiner

METHOD AND SYSTEM FOR DIRECT RENDERING OF MULTI-VOLUME DATA

CROSS-REFERENCE TO RELATED APPLICATIONS

The present application seeks priority to U.S. Provisional Application 60/952,388, filed Jul. 27, 2007, the entirety of which is incorporated by reference herein.

FIELD OF THE INVENTION

The present invention relates to volumetric renderings. More specifically, the aspects of the present invention relate to a method and system for direct rendering of multi-volume data.

BACKGROUND INFORMATION

In the last two decades, significant efforts have been expended on improving the performance of volumetric rendering. Conventionally, single volume rendering can achieve interactive frame rates on a commodity PC platform with or without hardware acceleration. Research, however, has not concentrated on multiple volume renderings with different orientation, size and resolutions. Conventional methods usually attempt to register and resample the different volumes so that they have the same orientation, size and resolutions. The preprocessing and memory overhead for registering and resampling are sometime quite large. Re-sampling will often time reduce the quality of the original data.

The data generated by modern medical image devices has expanded very quickly. For example, multi-slice Computed Tomography, (hereinafter "CT") scans can generate a several thousand slice dataset in minutes. Conventional methods for reading each slice by a radiologist is not practical and volume rendering of the data set is needed for understanding and diagnosing this kind of complex dataset.

Using one modality to diagnose a dataset is no longer enough for evaluative purposes. There is an increasing demand for multi-modality fused volume rendering. Examples include using CT or MR data together with PET and SPECT to locate small tumors that appear when conjugating anatomical information with physiological abnormalities. Additional potential uses of data may include fusing MR angiography with MR brain data to allow the physician to predict eventual cerebral damage produced by vascular accidents. Another potential use example involves fusing CT datasets obtained from the same scanner for the same patient but at different treatment stages to determine the effectiveness of the certain cancer treatment.

Conventional methods for fusing data either assume that there are no overlapping regions between multiple volumes and therefore it essentially equals single volume rendering or they require all the volume to be aligned and have the same resolution. Usually a reference volume with the finest resolution is identified as the reference volume and all the other volumes need to register and resample accordingly so that they can be aligned and have the same resolution. This process requires more memory than the original datasets and consequently needs a long preprocessing time. These methods use brute force ray-casting algorithms without optimizing for performance. Ray-Casting without performance optimization is a slow process. Most effective optimization mechanisms involve space leaping and early ray termination techniques.

Graphics hardware and bricking mechanisms may render multiple arbitrarily oriented volumes with different sizes and resolutions effectively.

There is therefore a need to provide a method and apparatus to perform accurate multi-volume rendering without the need to expensive graphics hardware enhancement devices.

There is also a need to provide a method and apparatus to perform these renderings with minimal input from an individual using the diagnostic equipment.

There is a further need to provide a method and apparatus to use ray-acceleration technologies to enhance rendering speed and accuracy.

SUMMARY OF THE INVENTION

It is an objective of an aspect of the invention to provide a method and apparatus to perform accurate multi-volume rendering without the need to expensive graphics hardware enhancement devices.

It is also an objective of an aspect of the invention to provide a method and apparatus to perform these renderings with minimal input from an individual using the diagnostic equipment.

It is a further objective of an aspect of the invention to provide a method and apparatus to use acceleration technologies to enhance rendering speed and accuracy.

The objectives of the invention are achieved as illustrated and described. In a specific exemplary embodiment, a method for performing direct rendering of a multi-volume data, is presented, the method comprising determining whether a volume of the multi-volume data is one of active and inactive via interaction with a ray for the multi-volume data, recording in triplicate a starting point and an end point of the ray for an eyespace, repeating the determining whether the volume is one of active and inactive via interaction with a ray for the multi-volume data and the recording in triplicate a starting point and an end point of the ray for an eyespace for all volumes of the multi-volume data; providing triples from all volumes to an array, sorting the array to create a sorted triples list array, breaking the ray into a plurality of segments using the sorted triples list array; determining which volumes are active for each of the segments via an active volume list, and sampling each segment of the ray to acquire an accumulated result.

In another exemplary embodiment of the invention, the method may further comprise the step of comparing the ray to volume boundaries, clipping planes and crop boxes for every volume.

In a still further exemplary embodiment, the method may be accomplished such that the volume is determined to be inactive when the ray does not intersect with a volume. In a still further exemplary embodiment, the method may be accomplished such that the recording in triplicate comprises p, $v_n$ and s/e values.

In another exemplary embodiment, the method may be accomplished such that p represents a z position in the eye space, $v_n$ represents the volume the ray is a member of and the s/e value represents whether a position is one of a starting point and end point.

In another exemplary embodiment, the method may be accomplished such that the step of determining which volumes are active, further comprises determining when a third element of the triple is one of an s and an e, adding the volume number that is the second element of the triple to an active volume list when the third triple is an s, and removing the volume number that is the second element of the triple from the active volume list when the third element of the triple is an e.

In a still further exemplary embodiment of the invention, a program storage device readable by machine is presented, tangibly embodying a program of instructions executable by machine to perform method steps for performing direct rendering of a multi-volume data, comprising determining whether a volume of the multi-volume data is one of active and inactive via interaction with a ray for the multi-volume data, recording in triplicate a starting point and an end point of the ray for an eyespace, repeating the determining whether the volume is one of active and inactive via interaction with a ray for the multi-volume data and the recording in triplicate a starting point and an end point of the ray for an eyespace for all volumes of the multi-volume data, providing triples from all volumes to an array, sorting the array to create a sorted triples list array, breaking the ray into a plurality of segments using the sorted triples list array, determining which volumes are active for each of the segments via an active volume list, and sampling each segment of the ray to acquire an accumulated result.

In a further exemplary embodiment, the program storage device may be configured such that the method performed further comprises comparing the ray to volume boundaries, clipping planes and crop boxes for every volume.

In a still further exemplary embodiment, the program storage device may be configured such that in the method performed the volume is determined to be inactive when the ray does not intersect with a volume.

In another exemplary embodiment, the program storage device may be configured such that in the method performed the recording in triplicate comprises p, $v_n$ and s/e values.

In a still further exemplary embodiment, the program storage device may be configured wherein p represents a z position in the eye space, $v_n$ represents the volume the ray is a member of and the s/e value represents whether a position is one of a starting point and end point.

In another exemplary embodiment, the program storage device may be configured such that in the method accomplished the step of determining which volumes are active, further comprises determining when a third element of the triple is one of an s and an e, adding the volume number that is the second element of the triple to an active volume list when the third triple is an s, and removing the volume number that is the second element of the triple from the active volume list when the third element of the triple is an e.

DETAILED DESCRIPTION

Aspects of the present invention provide for a method that has an algorithm that is used to perform rendering of images from data. The data is obtained from various methods, such as CT and MR scans of medical patients, as a non-limiting example. The method provided has two basic premises. The first premise is to construct disjointed segments of a ray. The second premise is to render each disjointed segment according to its contents. Aspects of the present invention allow for an efficient method of constructing segments for analysis. Additionally, embodiments use spatial coherence to enhance the sorting of the segments and determine which volumes are active in each segment. Multi-Reduced Path Octree structures are used to enhance (speed up) rendering by skipping empty regions of every volume. The algorithm of the present invention is purely software based without any hardware acceleration. The algorithm can achieve similar performance to those using hardware acceleration, such as those used with modern Graphical Processing Units (GPUs).

An exemplary embodiment of the present invention achieves a similar goal with different methods. In an exemplary method of the present invention, a software based method is provided that uses a ray-casting algorithm and therefore does not depend on any graphics hardware, to provide a quick and accurate fused rendering from multiple data volumes. By utilizing separate space leaping structures for different volumes and intelligent ray segment processing, the algorithm can achieve similar performance compared to using the high end graphics hardware.

In an exemplary embodiment, the present invention uses ray casting as one method to directly visualize datasets with three spatial dimensions (x,y,z for example). These dimensions are hereinafter are called a triple. A hypothetical ray is cast from a virtual camera (point of view) inside the scene (volume to be rendered) and traverses scalar voxel values of a dataset. These scalar values are obtained (fetched) by a method (hereinafter called "sampling"), wherein at every sample location a trilinear interpolation of eight corner values that each voxel possesses is performed.

Once the trilinear interpolated values are determined, a classification is calculated via lookup tables, also known as transfer functions, which assign an opacity, alpha and color (R,G,B) to the interpolated value. This interpolation and classification is performed for every valid sampling position along the ray until the ray is fully traversed.

There are two directions to composite (accumulate) the scalar values: front-to-back and back-to-front. The result of the accumulation is a final pixel that will be depicted on the viewing screen, based upon the data set. The process is continued for each portion of the data set until a final pixel set is created. The final pixel set is then displayed.

The fusion renderer of the present invention is based on a ray-casting algorithm. In order to handle multiple volumes, the following features are used to maintain correctness and efficiency. In an aspect of the present invention, an efficient method for constructing disjointed segments is provided. Additionally, an aspect of the present invention provides for spatial coherence to speed up the sorting of these segments and determining which volumes are active in each segment. Each disjoint segment is treated independently and a leader volume is used to guide the whole sampling process for a segment that is introduced to ensure correctness. Multi-Reduced Path Octree structures are used to speed up the rendering by skipping empty regions of every volume.

Generating Disjoint Segments for a Ray

For multi-volume rendering, if data points are each sampled along the ray for every volume, it is a very time consuming and consequently cost prohibitive operation. Along a ray, however, there may be only a portion of the ray that needs to be rendered in fused mode—these are the overlapping regions of volumes. Even in the overlapping region not every volume is active, therefore the rays are pre-processed before the actual sampling and compositing occurs.

The result of the preprocessing are several disjoint ray segments which have the information of whether there are one, two or more volumes active.

Before the casting of the ray starts, each ray is tested against the volume boundaries, clipping planes and crop boxes for every volume in the scene. If the ray doesn't intersect with a volume, this volume is deemed as inactive for this ray. If the ray does intersect with a volume, the starting point and end point of this ray in the eye space with regard to this volume is recorded in a triple (p, $v_n$, s/e) where p is the z position in the eye space, $v_n$ is which volume it belongs to and s/e decides whether this is a starting or ending point. After this analysis is performed for all the volumes, all the triples are put into an array and sorted according to their z position in the eye space. Sorting occurs in the z position as it is desirable to determine the sample order for the later front to back or back to front compositing.

Active Volume List Determination and Sorting Acceleration

Figure 1:
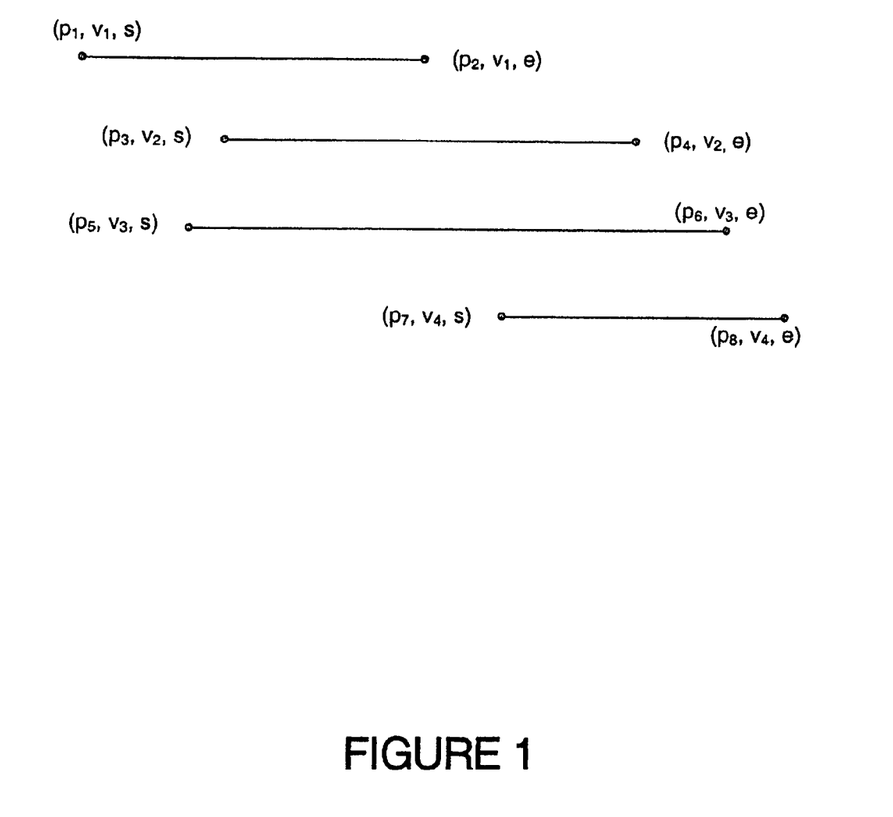
FIG. 1 pictorial representation of a ray used for multi-volume rendering.
Figure 2:
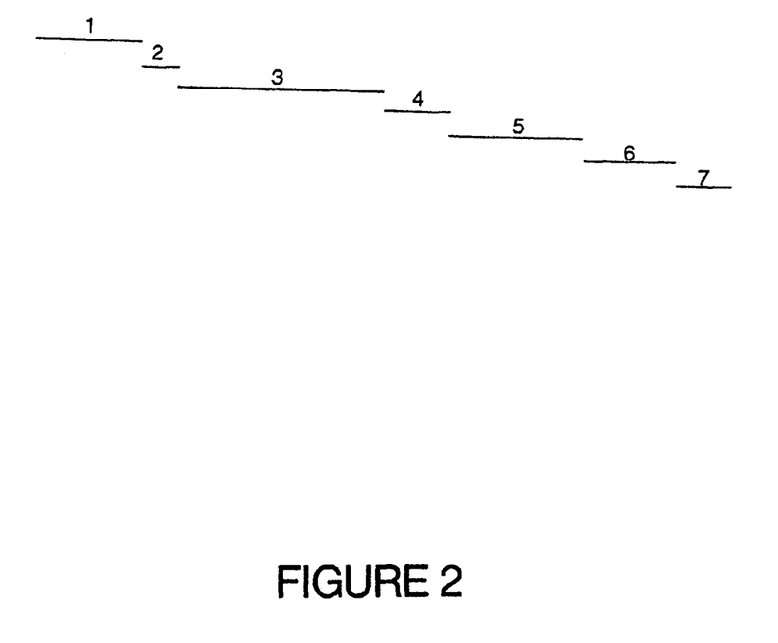
FIG. 2 is a resulting segment of FIG. 1 after processing.

The sorted list is used to break the ray into several segments and the volumes involved in each segment is determined using the sorted triplet list. The example in FIG. 1 is used to demonstrate how to determine which volumes are active for each segment. In FIG. 1, four volumes are active for this ray (intersect with the ray). They are named $V_1$, $V_2$, $V_3$ and $V_4$. Each volume has a start and end point for this ray and therefore there are 8 triplets $(p_2, V_1, e)$, $(p_3, V_1, s)$ ... $(p_8, v_4, e)$. After the data is sorted against the position, the order of the list becomes $(p_1, v_1 s)$, $(p_5, v_3, s)$, $(p_3, v_2, s)$, $(p_2, V_1, e)$, $(p_7 v_4, s)$, $(p_4, v_2, e)$, $(p_6, v_3, e)$ and $(p_8, v_4, e)$. From these points, there are 7 segments: Segment one is from $(p_1, v_1, s)$ to $(p_5, v_3, s)$. Segment 2 is from $(p_5, v_3, s)$ to $(p_3, v_2, s)$ .... Segment 7 is from $(p_6, v_3, e)$ to $(p_8, v_4, e)$. This is shown in FIG. 2. For each segment, it is determined which volume is active in this segment. For each segment starting point, it is noted whether the third element of the triplet is an s or an e. If it is an s, the volume number is added which is the second element of the triplet to the active volume list. If it is an e, the corresponding volume is dropped from the active volume list. For the first segment, since the third element of the segment starting point $(p_1, v_1, s)$ is an s, $v_1$ is added to the active volume list for this segment. For the second segment, the third element of the segment starting point $(p_5, v_3, s)$ is an s, $v_3$ is added to the active volume list and therefore $v_1$ and $v_3$ are active. Similarly for the third segment it is determined if $v_1$, $v_2$ and $v_3$ are active. For segment #4, the third element of the segment starting point $(p_2, v_1, e)$ is an e and the corresponding volume $v_1$ is dropped out of the active volume list and therefore only $v_2$ and $v_3$ are active for this segment. Similarly for segment #5, $v_2$, $v_3$ and $v_4$ are active. For segment #6, $v_3$ and $v_4$ are active and for segment #7, only $v_4$ is active.

Sorting can be speeded up (enhanced) and active volume determination process by using the corresponding information from the neighboring ray that is cast before this one. For example, assume that information is already obtained for the ray in FIG. 1. The next ray is then to be determined that is adjacent to the one previously evaluated. Because of the spatial coherence, it is very likely that the order of the starting and ending points and the volume activeness would be very similar if not the same as the previous ray. Therefore, after calculating the new ray's intersection points with the volumes and constructing the triplets using these points, the points are put in the same order as the previous ray. It is then determined whether the order is preserved. Using the example of FIG. 1, it queries whether the order $p_8 >= p_6 >= p_4 >= p_7 >= p_2 >= p_3 >= p_5 >= p_1$ is still true or not. If it is, there is no need to sort or determine the volume activeness of each segment because the information can be reused from the previous ray. If it is not true, the data is sorted and the active volume list is determined in each segment, as before. Because of the spatial coherence, the difference of the order should not be significant and therefore the sorting should be faster than if the points are put in a random order.

Sampling Segments

After the ray is broken down into different segments and the active volume list is generated for each segment, each segment is sampled to get the accumulated result for this ray.

Every segment is handled one at a time and each volume has its own distance between two samples, which is defined as the sampleUnit. To treat the boundary of two segments correctly, the previous segment has to record the sample position of the last samples. The sampleUnits are added to the positions as the starting sample positions for the new segment with regard to different volumes. This is to ensure that all the samples for a volume have the same sampling distance and therefore the same sampling rate.

For each segment there are 4 different scenarios.
1. No volume is active
2. Only one volume is active for the segment (single volume sampling)
3. Multiple volumes are active for the segment (fused sampling)
4. The segment is smaller than the smallest sample unit For the first case, nothing has to be done and analysis proceeds to the next segment.

For the second case, it is the same as the single volume rendering. Since only one volume is active the sampling order is of no concern for different volumes and therefore sampling this segment should be as fast as standard raycast.

Figure 3:
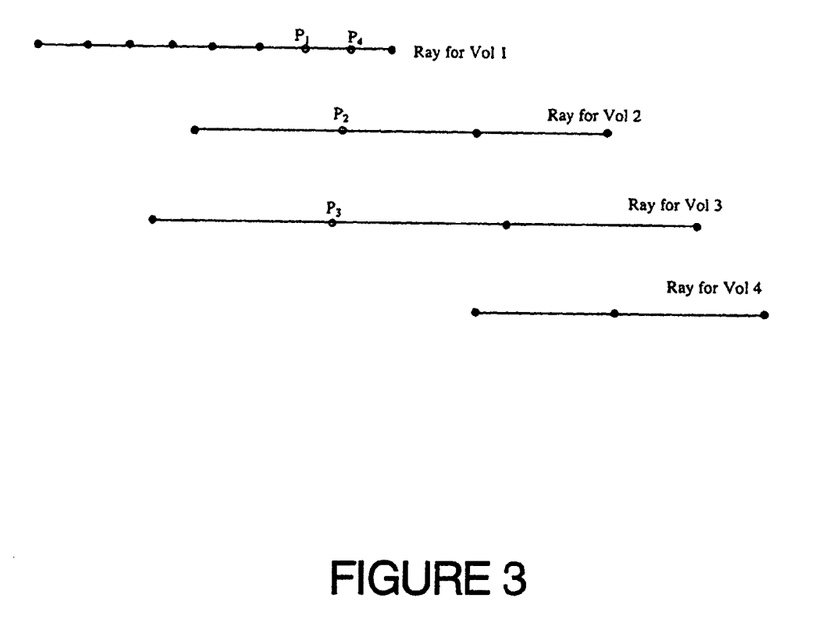
FIG. 3 is a sampling sequence P for a ray of four different volumes.

For the third case, multiple volumes are handled. Since multiple volumes can be arbitrarily oriented and have arbitrary sampling distance, the samples are composited from different volumes in the correct world/camera coordinate. In order to perform this function, an algorithm has been determined where the volume is identified with the smallest sample unit as the leader volume. The sampling of this volume is used as the main control loop. After each sample of this volume, it is checked whether there are samples from other volumes that fall in between this sample and the next sample for the leader volume. If yes, the samples are sampled and composited. Otherwise, the process proceeds to the next sample of the leader volume. As illustrated from the example described in FIG. 3, this method has one potential drawback. All the samples between the two neighboring samples of the leader volume are not necessarily in the correct order. The samples need to be sorted and then composited to the frame buffer. Alternatively, it can be assumed that they are all at the position of the leader volume and then use alpha correction to get the correct value for compositing. Equation 1 describes the alpha correction. As the sampling rate difference between the correct position and the position that is used should be small, a first order of the Taylor series is used to calculate the alpha correction as shown in Equation 2. When the leader has reached the segments end, sampling may have been missed in the last valid positions of the other volumes. This is a last check which concludes the rendering of a multi volume segment by finishing the "leftovers".

$$a_{new} = 1 - (1 - a_{old}) \frac{SampleRateOld}{sampleRateNew} \qquad (1)$$

-continued $$a_{new} = 1 - (1 - a_{old}) \times \frac{sampleRateOld}{sampleRateNew} \qquad (2)$$

The fourth case is actually a special case for case two. Samples are tested to see if they may fall in this segment by using the method described before: recording the last sample positions of the previous segment and add the sampleUnits to the positions as the new starting positions. If any starting positions for any volumes fall into this segment, they are sampled them.

Space Leaping and Early Ray Termination:

Space leaping is relied on and early ray termination to speed up Multi-volume Fused Volume Rendering. For every volume, one Reduced Path Octree associated with it. Each octree needs only less than one tenth of the original volume. Any samples along a ray are tested against its associated octree to determine whether it belongs to an "empty" region and if so no interpolation or compositing is needed. Only the samples of the "active" volume need to be tested. Those non-empty samples will be accumulated. During processing of a segment, the accumulated alpha value of the ray are tested against the pre-specified alpha threshold. If it exceeds the threshold, the sampling and accumulation will stop for this segment and any segments after this will be discarded. Also the casting for this ray is finished.

Exemplary Embodiment and Results

The fused volume renderer can evaluate multiple datasets with different size, resolution, orientation as inputs and render them in one scene (without the usual resampling by other published renderers). The renderer is also able to handle each volume's cut plane, crop box, shading, sampling rate independently. The renderer is purely software based without any hardware acceleration. The method can reach interactive performance of more than 20 FPS for 512×512 output image size and 9-10 FPS for 1 k×1 k output image size on an over the shelf PC platform.

Figure 4:
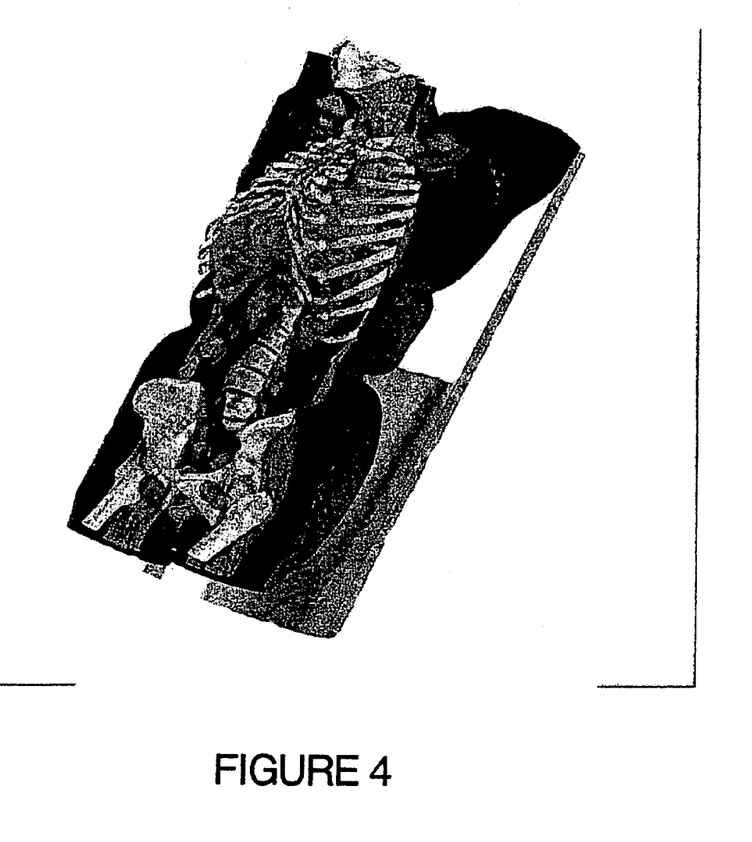
FIG. 4 is a three volume fused image after processing.
Figure 5:
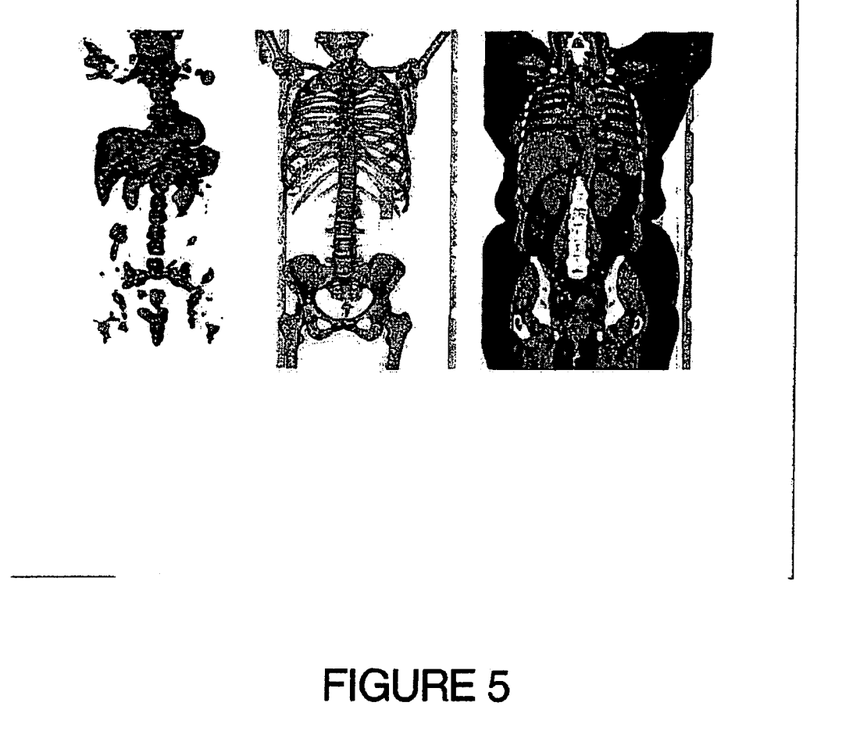
FIG. 5 is a three volume depiction with a corresponding transfer function.

The algorithm was tested on a Dell Precision 690 workstation with two 3.0 Ghz and 4 MB L2 cache Dual Core Intel Xeon Processor 5160 processor, 4 GB of DDR2 667 MHz SDRAM. The tested datasets are two CT datasets and one PET dataset. The two CT datasets are the same data with different transfer function. The sizes of the CT datasets are 512×512×225 and the size of the PET dataset is 128×128×227. The transfer function used for CT1 is to reveal the soft tissue while the transfer function used for CT2 is to reveal the translucent bone structure. The transfer function used for PET dataset is to reveal areas of radionuclear uptake. The following table shows the average interactive and definitive performance of the renderer with 512×512 and 1 k×1 k output window size. FIGS. 4 and 5 show the resulting image with all three volumes fused together and all three volumes separated.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method for performing direct rendering of a multi-volume data, comprising:
    determining whether a volume of the multi-volume data is one of active and inactive via interaction with a ray for the multi-volume data;
        recording in triplicate a starting point and an end point of the ray for an eyespace;
        repeating the determining whether the volume is one of active and inactive via interaction with a ray for the multi-volume data and the recording in triplicate the starting point and the end point of the ray for an eyespace for all volumes of the multi-volume data;
        providing triples from all volumes to an array;
        sorting the array to create a sorted triples list array;
        breaking the ray into a plurality of segments using the sorted triples list array;
        determining which volumes are active for each of the segments via an active volume list; and
        sampling each segment of the ray to acquire an accumulated result, wherein multi reduced path octree structures are used on each volume during the determining whether the volume of the multi-volume data is one of active and inactive.

2. The method according to claim 1, further comprising:
    comparing the ray to volume boundaries, clipping planes and crop boxes for every volume.

3. The method according to claim 1, wherein the volume is determined to be inactive when the ray does not intersect with a volume.

4. The method according to claim 1, wherein the recording in triplicate comprises p, $v_n$ and s/e.

5. The method according to claim 4, wherein p represents a z position in the eye space, $v_n$ represents the volume the ray is a member of and the step value represents whether a position is one of a starting point and end point.

6. The method according to claim 1, wherein the step of determining which volumes are active, further comprises:
    determining when a third element of the triple is one of an s and an e;
    adding the volume number that is the second element of the triple to an active volume list when the third triple is an s; and
    removing the volume number that is the second element of the triple from the active volume list when the third element of the triple is an e.

7. The method according to claim 1, wherein the sorting of the array to create a sorted triples list array is performed using spatial coherence.

8. The method according to claim 7, wherein the spatial coherence is used to determine which of the volumes are active.

9. The method according to claim 7, wherein the spatial coherence speeds up the sorting of the segments wherein each disjoint segment is treated independently.

10. The method according to claim 1, wherein the determining which volumes are active for each of the segments via an active volume list involve one of determining if no volume is active, determining when only one volume is active, determining when multiple volumes are active and determining when segment is smaller than a smallest sample unit.

11. The method according to claim 10, wherein the determining when only one active volume is performed as a single volume rendering, the determining when multiple volumes are active is performed by an algorithm that identifies a smallest sample unit as a leader volume and each volume is checked whether there are samples from other volumes that fall in between the leader volume and a next sample, and the segment is smaller than the smallest sample unit is performed wherein samples are tested and last sample positions are recorded of the previous segment and add sample units to the last sample positions.

12. A program storage device readable by machine, tangibly embodying a program of instructions executable by machine to perform method steps for performing direct rendering of a multi-volume data, comprising:
   determining whether a volume of the multi-volume data is one of active and inactive via interaction with a ray for the multi-volume data;
   recording in triplicate a starting point and an end point of the ray for an eyespace;
   repeating the determining whether the volume is one of active and inactive via interaction with a ray for the multi-volume data and the recording in triplicate a starting point and an end point of the ray for an eyespace for all volumes of the multi-volume data;
   providing triples from all volumes to an array;
   sorting the array to create a sorted triples list array;
   breaking the ray into a plurality of segments using the sorted triples list array;
   determining which volumes are active for each of the segments via an active volume list; and
   sampling each segment of the ray to acquire an accumulated result, wherein multi reduced path octree structures are used on each volume during the determining whether the volume of the multi-volume data is one of active and inactive.

13. The program storage device according to claim 12, wherein the method performed further comprises:
   comparing the ray to volume boundaries, clipping planes and crop boxes for every volume.

14. The program storage device according to claim 12, wherein in the method performed the volume is determined to be inactive when the ray does not intersect with a volume.

15. The program storage device according to claim 12, wherein in the method performed the recording in triplicate comprises p, $v_n$ and s/e values.

16. The program storage device according to claim 15, wherein p represents a z position in the eye space, $v_n$ represents the volume the ray is a member of and the s/e value represents whether a position is one of a starting point and end point.

17. The program storage device according to claim 12, wherein in the method accomplished the step of determining which volumes are active, further comprises:
   determining when a third element of the triple is one of an s and an e;
   adding the volume number that is the second element of the triple to an active volume list when the third triple is an s; and
   removing the volume number that is the second element of the triple from the active volume list when the third element of the triple is an e.

18. The program storage device according to claim 12, wherein the sorting of the array to create a sorted triples list array is performed using spatial coherence.

19. The program storage device according to claim 18, wherein the spatial coherence is used to determine which of the volumes is active.

20. The program storage device according to claim 12, wherein the determining which volumes are active for each of the segments via an active volume list involves one of determining when no volume is active, determining when multiple volumes are active and determining when a segment is smaller than a smallest sample unit.

* * * * *